July 26, 1960 C. G. BRAGAW, JR., ET AL 2,946,711
SAFETY-GLASS LAMINATE
Filed Dec. 11, 1957
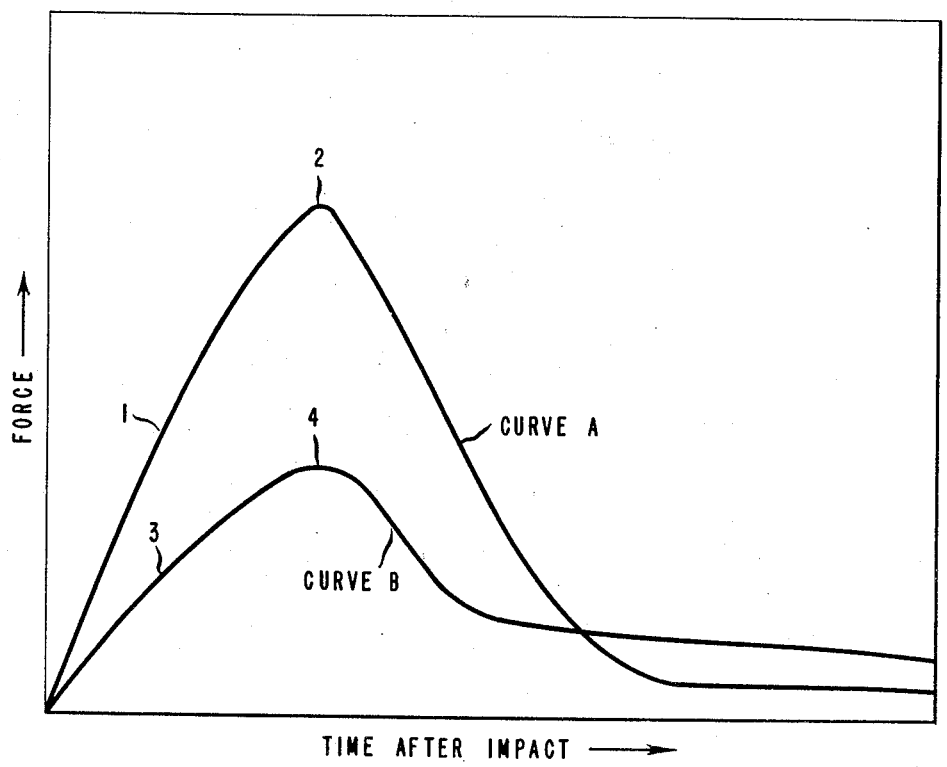
INVENTORS
CHESTER GRISWOLD BRAGAW, JR.
WILLIAM GOODRICH SIMERAL
BY
ATTORNEY

United States Patent Office 2,946,711
Patented July 26, 1960

2,946,711

SAFETY-GLASS LAMINATE

Chester Griswold Bragaw, Jr., West Chester, Pa., and William Goodrich Simeral, Wilmington, Del., assignors to E. I. du Pont de Nemours and Company, Wilmington, Del., a corporation of Delaware Filed Dec. 11, 1957, Ser. No. 702,047

6 Claims. (Cl. 154—2.77)

This invention relates to a novel and improved safety-glass laminate.

Safety-glass laminates used for automotive windshields have for some time been formed of three standardized components; namely, two outer layers of sheet glass, each approximately 0.120 inch in thickness, and an interlayer of plasticized polyvinyl butyral approximately 0.015 inch thick. Safety glass is used in automobile windshields in order to (a) retain passengers in the vehicle in an accident, (b) to protect passengers from flying missiles, and (c) to eliminate flying glass particles in the event of breakage of the glass. It is desired that these goals be achieved without introducing the hazards of skull fracture, brain concussion, and loss of visibility through the glass. Retention of the passenger within the automobile normally involves the sudden impact of the passenger's head against the windshield, which, in turn, must be strong enough not to permit penetration of the windshield. Avoidance of severe laceration also demands that no part of the head penetrate the windshield, since partial penetration may result in the formation of a sharp glass "collar" around the head or neck. The incidence of skull fracture is related to the maximum force exerted on the head, and brain concussion is related to the rate of increase of force applied to the head, this rate being called "onset" herein. Tests using 9.2-pound headforms and using safety glass approximately half the size of a standard automotive windshield (i.e. about the same width and half as long as a standard automotive windshield) show that, over the operating temperature range of cars, 0° F. to 120° F., present-day windshields are capable of resisting penetration by a human head at striking speeds up to a maximum of about 9 m.p.h. The fracture pattern of a complete windshield is symmetrical, indicating that it is neither stronger nor weaker in the long direction than in the short direction. Thus, tests on windshield halves provide results substantially the same as the results on complete windshields. The variation of these speeds with temperature of the glass is shown below.

*Table I*

| Temperature | Average Striking Speed for Head Penetration, m.p.h. |
|---|---|
| 0° F | 8.1 |
| 82° F | 9.4 |
| 120° F | 6.7 |

The speeds of modern vehicles are so great that these safety-glass windshields are obsolete from a safety standpoint. Furthermore, in many accidents a skull fracture results from the force of the passenger's head hitting the glazing. An independent study which strongly confirms this conclusion of obsolescence is "An Engineering Pilot Study to Determine the Injury Potential of Basic Automotive Interior Design," Snyder, Reno, Imhof, Baubles, Mattson, and Stephens, Report No. 3, Project TB1–1000, Research and Development Division, Ordnance Corps, U.S. Army, Aberdeen Proving Ground, Md. It is recommendation 1 of this report that an improved safety glass be developed.

It is the object of this invention to provide a safety-glass laminate having improved safety features. It is another object of this invention to provide a safety-glass laminate capable of withstanding penetration by a human head striking the laminate at speeds up to 40 m.p.h. It is still another object of this invention to provide a safety-glass laminate capable of withstanding penetration by a human head striking at speeds up to 40 m.p.h., while, at the same time, greatly reducing the hazard of skull fracture. Other objects will be apparent from the more detailed explanation of this invention.

The above objects of the invention are accomplished by increasing the thickness of the interlayer, by changing the plasticizer-hydroxyl balance in the interlayer composition so as to increase the ratio of plasticizer to the amount of vinyl alcohol (PVA) in the interlayer, and by reducing the thickness of the glass layer. A preferred structure is made of a central interlayer of polyvinyl butyral, containing 20% hydroxyl calculated as vinyl alcohol (PVA), and 32% triethylene glycol di(2-ethyl butyrate) as a plasticizer and being at least 0.060-inch thick, and having two outer glass layers, each of which is from 0.50–0.125 inch in thickness.

Present-day safety-glass laminates are made using a plastic interlayer whose base resin is composed of a polyvinyl alcohol partially condensed with butyraldehyde so that it contains 15–30% of unreacted hydroxyl calculated as weight percent of vinyl alcohol (PVA) and 0–2% of ester calculated as weight percent of vinyl acetate. This plastic interlayer material is commonly called polyvinyl butyral (PVB). The plasticizer commonly employed is an ester of a polybasic acid or of a polyhydric alcohol. Particularly desirable plasticizers are triethylene glycol di(2-ethyl butyrate), dibutyl sebacate, di(beta-butoxyethyl)adipate, and dioctyl phthalate. Present-day commercial interlayers may use from about 29–32% by weight of plasticizer in polyvinyl butyral compositions containing 17–25% PVA.

Research work relating to automobile accidents indicates that the average impact speed of cars is 27 m.p.h. in urban accidents and 41 m.p.h. in rural accidents. The speed of the auto at impact is substantially higher than the head-windshield striking speed because of the absorption of energy by the car structure. Therefore, if a safety glass functions properly at the usual service temperatures when a head strikes it at 40 m.p.h., it will afford suitable safety protection for most accidents.

The attached drawing illustrates the forces involved at, and immediately after, the time of impact of a blunt object with a safety-glass laminate.

Curve A represents the forces involved in the striking of a present-day safety glass. Curve B represents the forces involved in the striking of the improved safety glass of this invention with the same missile at the same conditions of temperature and striking speed. Two features of these curves are important in safety considerations. Points 2 and 4 represent the maximum force, respectively, of each of the two curves. This point is referred to as the "peak force" herein. The rate of force application, the slope of lines 1 and 3, is the "onset," as described above. Peak force is directly related to skull fractures; the higher the maximum force, the greater the likelihood that the skull which exerts that force will be fractured. "Onset," the rate of increase of force, is important since it has been shown that a given force is more damaging when applied rapidly than when applied slowly (i.e., a large onset is undesirable). Experimentally, it has been found in measurements on laminated safety glass that lower onsets are related to lower peak forces. The drawing makes it clear that what is desired is a low peak force and a low onset at relatively high impact velocities.

In order to stop the head when it strikes the safety glass, the kinetic energy of the head must be absorbed by the safety glass. A high energy absorption associated with a high peak force is not practical because retention of the passenger within the auto would be accomplished at the expense of a fractured skull and a brain concussion. What is desired is a high energy absorption and a low peak force. The energy absorption is desirably adjusted with the peak force such that the optimum combination of these properties occurs over the temperature range of 0° F. to 120° F.

Three changes in the safety-glass structure have been found necessary in order to produce the desired effect. The glass panes must be thinner, the interlayer must be substantially thicker, and the interlayer should have a higher proportion of plasticizer in relation to PVA content than is commonly employed in safety-glass structures of today.

Investigations of the fracture of laminated safety glass have revealed that (1) decreasing the glass thickness sharply reduces peak force (and hence skull fracture hazard), yet the energy absorption remains substantially unchanged, (2) increasing interlayer thickness increases energy absorption in an exponential manner; thus, providing unexpectedly large increases in energy absorption at large increases in thickness, while the peak force remains substantially unchanged, and (3) changing the size of the object striking the glass and changing the interlayer thickness changes the ratio of energy absorptions at 0° F. and 120° F. Thus it has been discovered that peak force, onset, and energy absorption are not uniquely related, and that these and other performance features have been related to various physical aspects of the safety-glass structural design. For example, a composition which provides balanced behavior at 0° F. and 120° F. in the standard break-height test using a 1½-inch diameter steel ball (ASA Std. Safety Code Z 26.1–1950) provides deficient 0° F. energy absorption when hit by a headform (approximately 6 inches in diameter). The weight and shape of the missile employed in testing safety glass are important variables, and it has been found that the use of a missile the size and shape of a human head provides results most nearly representing the extremes of energy absorption required in practical applications of safety glass. Road missiles, such as rocks, possess much less kinetic energy and do not present hazards to a laminate designed to resist penetration by a human head.

As an illustration of this invention, the peak force of a ½-pound steel ball hitting a standard safety glass, made of two glass panes each 0.120 inch in thickness separated by an interlayer 0.015 inch in thickness, at a speed of 25 m.p.h. and at 0° F., is 2,140 pounds. When the safety glass is made with glass panes of 0.090 inch in thickness and all other conditions are the same, the peak force is 850 pounds. On the other hand, the standard break-height test for energy absorption using a ½-pound ball (American Standard Safety Code Z 26.1–1950) at 0° F. shows a break height of 18.0 feet for the laminate made with 0.120-inch thick glass panes, and a break height of 16.4 feet for a laminate made with 0.090-inch thick glass panes. The break height is a measure of the ability of the laminate to absorb the energy of a falling ball without permitting the laminate to be penetrated by the ball.

The reduction in peak force by the use of thinner glass layers will serve to reduce the hazard of skull fractures, but it does not prevent the penetration of the laminate by the impacting head, and therefore does not reduce the hazards of severe laceration by the sharp edges of glass in the penetrated windshield. Likewise, the use of thinner glass will not prevent the automobile passenger from being thrown completely out of the protection of the automobile enclosure. An analysis of automobile accident statistics shows that the chance of serious injury or death doubles if the passenger is ejected from the automobile.

An increase in the thickness of the interlayer has been found to provide a greater capacity for absorbing energy and thereby to provide a greater resistance to penetration. The energy absorption increases approximately exponentially with interlayer thickness such that in the vicinity of the standard thickness of 0.015 inch, the values of break height change much more slowly with a change in thickness than they do at a thickness of 0.060 inch.

The data in Table II illustrate the change in break height which occurs with a change in the thickness of the interlayer. Break height is here measured according to the method described in ASA Z–26.1–1950 with the single exception that a 2-pound ball was used in place of the ½-pound ball specified in the test method. This change was required because the ½-pound ball was incapable of breaking the thicker interlayers from convenient heights for dropping the ball onto the laminate. Laminates were supported rigidly on a rubber mount approximating an automobile windshield mount. It is of interest to note in these data that the use of the 2-pound ball produced a consistently lower break-height value at 0° F. than at 120° F., while the use of a ½-pound ball on the laminates with the thinner interlayers produced corresponding values (not reported here) which were substantially equal at the two temperatures.

*Table II*

| Interlayer Thickness | Break Height at 0° F., feet | Break Height at 120° F., feet |
| --- | --- | --- |
| 0.015 inch | 2 | 8 |
| 0.030 inch | 4 | 13 |
| 0.045 inch | 8 | 23 |
| 0.060 inch | 14 | 56 |

In addition, it has been found that the ratio of break heights at 0° F. and 120° F. is affected not only by interlayer thickness, but by size of the missile (diameter and radius of curvature), size of the glass structure and whether the structure is supported on wood or in automotive rubber channel.

If the plasticizer content is improperly chosen relative to the PVA content of the polyvinyl butyral resin, the energy absorption at one or the other end of the service temperature range (0° F. to 120° F.) will be deficient. Plasticizer content should be chosen so that break heights at both ends of the temperature range are as high as possible under the most severe blow possible. This condition requires that the break heights at the ends of the temperature range be made equal, or as nearly equal as possible, under the most severe conditions expected. Since the highest energy blow which safety glass is called upon to withstand is that of a human head, it is necessary to select the plasticizer content so as to give a balanced break height when using a headform missile, and when testing safety glass structures having a size and mounting substantially reproducing automotive windshields. Tests of this type have been performed which show that a greater plasticizer/PVA ratio is needed than that used in present-day safety-glass interlayers. For example, energy absorption was measured on 18-inch square laminates using 0.120-inch thick glass and an interlayer 0.060-inch thick containing about 22.5% PVA. A 9.2 pound, 6½-inch-diameter headform missile was used and the safety glass was rigidly supported in rubber mounts. Data shown are in Table III.

Table III

| Plasticizer Content of Interlayer | Average Striking Speed to Penetrate Test Safety Glass | | |
|---|---|---|---|
| | 0° F. | Room Temp. | 120° F. |
| Normal: 30% triethylene glycol di(2-ethyl butyrate) | M.p.h. 14.7 | M.p.h. 42 (92–95° F.) | M.p.h. 21.0 |
| High: 35% triethylene glycol di(2-ethyl butyrate) | 21.3 | 38.8 (82° F.) | 19.7 |

Laminates made from an interlayer material which is more highly plasticized (relative to PVA content) have lower peak forces than those made using standard interlayer material. For example, peak forces were measured on laminates made from glass 0.120-inch thick and an interlayer 0.015-inch thick having about a 22.5% PVA content and plasticized as shown in Table IV. Peak forces were measured using a 10-ounce missile with a blunt striking surface (¾-inch radius of curvature) at an impact speed of 25 miles per hour.

Table IV

| Plasticizer Content of Interlayer | Peak Force, Pounds | |
|---|---|---|
| | 0° F. | 82° F. |
| Normal: 30% triethylene glycol di(2-ethyl butyrate) | 2,260 | 1,640 |
| High: 35% triethylene glycol di(2-ethyl butyrate) | 2,200 | 1,197 |

When the conventional safety-glass laminate is compared with the laminate of this invention, the peak forces are shown (Table V) to be much lower in the laminate of the present invention than in the conventional laminate, and, thus, the skull fracture hazard is much less. The conventional laminate was made using 0.120-inch glass and 0.015-inch interlayer containing about 22.5% PVA and plasticized with 30% of triethylene glycol di(2-ethyl butyrate). The new laminate is one employing 0.078-inch thick glass and a 0.060-inch interlayer containing about 22.5% PVA and plasticized with 35% of triethylene glycol di(2-ethyl butyrate). Peak forces were measured using a 10-ounce missile with a blunt striking surface (¾-inch radius of curvature) at an impact speed of 25 m.p.h.

Table V

| Laminate Construction | Peak Force, Pounds | | |
|---|---|---|---|
| | 0° F. | 86° F. | 120° F. |
| Conventional | 2,790 | 1,755 | 1,740 |
| New | 2,020 | 870 | 840 |

It is within the scope of this invention to provide laminations made with glass or glass-like materials having a thickness of not more than 0.125 inch, the minimum thickness being determined by the stiffness of the laminate, it being necessary that the laminate be thick enough to be handled and used for its intended purpose. Probably a minimum glass thickness for handling purposes is about 0.100 inch for the total thickness of both panes of glass. One glass layer may be thinner than the other glass layer, so long as the combined effect of the two layers is to provide sufficient stiffness. The preferred glass thickness is from about 0.050 inch to 0.100 inch for each of two layers, or a total of 0.100-inch to 0.200-inch total thicknesses.

The amount of plasticizer which is employed in the interlayer of this invention is the amount necessary to balance the break heights at 0° F. and 120° F. using a missile approximating a human head in weight and shape, and employing full-size laminates of the construction of this invention. Normally, the amount of plasticizer will be from 2% to 10% in excess of that used in conventional safety-glass laminates at a given PVA content. Thus, the amount of triethylene glycol di(2-ethyl butyrate) employed in this invention is approximately 27% by weight of the plasticized polyvinyl butyral at the 15% PVA level and 35% by weight of the plasticized polyvinyl butyral at the 23% PVA level. The broad range of plasticizer may be from 25–40% by weight of plasticizer, depending on the amount of PVA in the polyvinyl butyral resin. In most instances, this range will be from about 27–35% plasticizer.

As higher and higher concentrations of PVA are employed in the base resin, higher and higher amounts of plasticizer (within the 2–10% excess) are needed to balance the break heights. Other plasticizers may be used in the same general proportions given above. An approximation of the amount of plasticizer required may be calculated from the equation: $W = P + 12\%$, where $W$ = percent of plasticizer by weight of the plasticized polyvinyl butyral and $P$ = weight percent of PVA in unplasticized polyvinyl butyral.

The thickness of the interlayer may vary from about 0.030 to 0.120 inch, depending on the amount of energy absorption desired. The thicker interlayer produces a greater energy absorption, but at the same time adds to the cost and to the total thickness of the laminate. For ease of construction, the laminate should have a total thickness within the range of from 0.180 to 0.370 inch.

The laminate of this invention finds its principal use as an automobile windshield or as other windows of automobiles, although it is apparent that the laminate may be used in other vehicles or as the windows and doors of buildings, and wherever safety glass may be employed.

We claim:

1. An improved safety-glass laminate having a total thickness of 0.180 to 0.370 inch comprising two outer layers of glass bonded to a central layer of plasticized polyvinyl butyral, the total thickness of the two layers of glass being from 0.100 to 0.250 inch and the thickness of said central layer being from 0.030 to 0.120 inch in thickness, said polyvinyl butyral having a composition of 15–30% by weight of vinyl alcohol, 0–2% by weight of vinyl ester and the remainder vinyl butyral, said plasticized polyvinyl butyral containing 25–40% by weight of a compatible ester plasticizer, the exact amount of said plasticizer being that amount which will cause the break heights at 0° F. and at 120° F. of said laminate to be substantially equal when measured by the test described in American Standard Safety Code Z 26.1–1950 and modified by employing as the missile of the said test a ball 6.5 inches in diameter and weighing 9.2 pounds, and further modified by mounting the said laminate in a rigid rubber mounting substantially identical to that employed in mounting windshields in automobiles.

2. An improved automotive safety-glass laminate having a total thickness of 0.180 to 0.370 inch comprising two outer layers of glass bonded to a central layer of plasticized polyvinyl butyral, said layers of glass having a total thickness for both layers of 0.100 to 0.250 inch, said central layer being from 0.030 to 0.120 inch in thickness, said plasticized polyvinyl butyral comprising 27–35% by weight of a plasticizer from the group consisting of triethylene glycol di(2-ethyl butyrate), dibutyl sebacate, di(beta-butoxyethyl)adipate, and dioctyl phthalate, said polyvinyl butyral exclusive of plasticizer comprising 15–23% by weight of vinyl alcohol, 0–2% by weight of vinyl acetate, and the remainder vinyl butyral.

3. The laminate of claim 2 in which said central layer is about 0.060 inch in thickness, said plasticizer is triethylene glycol di(2-ethyl butyrate) and is present in the amount of 32% by weight of plasticized polyvinyl butyral, and said polyvinyl butyral contains about 20% by weight of vinyl alcohol.

4. The laminate of claim 2 in which said central layer is about 0.060 inch in thickness, said plasticizer is triethylene glycol di(2-ethyl butyrate) and is present in the amount of 35% by weight of said plasticized polyvinyl butyral, and said polyvinyl butyral contains about 23% by weight of vinyl alcohol.

5. The laminate of claim 2 in which each of said glass layers is 0.050 to 0.100 inch in thickness.

6. An improved safety-glass laminate comprising a central layer of plasticized polyvinyl butyral, containing 27–35% by weight of triethylene glycol di(2-ethyl butyrate), bonded to two outer layers of glass, each of which is 0.050 to 0.100 inch in thickness, said polyvinyl butyral exclusive of plasticizer comprising 15–23% by weight of vinyl alcohol, 0–2% by weight of vinyl acetate, and the remainder vinyl butyral, the amount of plasticizer and of vinyl alcohol being such that 27% of triethylene glycol di(2-ethyl butyrate) is employed with said 15% by weight of vinyl alcohol, and said 35% of triethylene glycol di(2-ethyl butyrate) is employed with said 23% by weight of vinyl alcohol.

References Cited in the file of this patent

UNITED STATES PATENTS 2,293,656    McClain _____ Aug. 18, 1942